United States Patent
Aoki

(10) Patent No.: US 8,989,939 B2
(45) Date of Patent: Mar. 24, 2015

(54) VEHICLE AND VEHICLE CONTROL METHOD

(75) Inventor: Takanori Aoki, Nisshin (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 14/009,490

(22) PCT Filed: Apr. 22, 2011

(86) PCT No.: PCT/JP2011/059903
§ 371 (c)(1),
(2), (4) Date: Oct. 2, 2013

(87) PCT Pub. No.: WO2012/144061
PCT Pub. Date: Oct. 26, 2012

(65) Prior Publication Data
US 2014/0032027 A1   Jan. 30, 2014

(51) Int. Cl.
*G06F 7/00* (2006.01)
*B60W 20/00* (2006.01)
*B60K 6/445* (2007.10)
*B60W 10/06* (2006.01)
*B60W 10/08* (2006.01)

(52) U.S. Cl.
CPC ............. *B60W 20/00* (2013.01); *B60W 20/106* (2013.01); *B60K 6/445* (2013.01); *B60W 10/06* (2013.01); *B60W 10/08* (2013.01); *Y02T 10/6286* (2013.01); *Y02T 10/6239* (2013.01); *Y10S 903/93* (2013.01); *B60W 2710/086* (2013.01); *Y10S 901/01* (2013.01)

USPC .......... 701/22; 701/1; 701/2; 701/23; 701/26; 701/49; 180/65.1; 180/65.29; 180/65.265; 180/168; 901/1; 903/930

(58) Field of Classification Search
CPC . A01D 34/008; A01D 34/006; G05D 1/0265; G05D 2201/0208; Y10S 901/01
USPC .......... 701/1, 2, 22, 23, 26, 49, 300; 180/65.1, 180/65.29, 65.265, 168; 901/1; 903/930
See application file for complete search history.

(56) References Cited

U.S. PATENT DOCUMENTS

| | | | |
|---|---|---|---|
| 8,256,547 B2 * | 9/2012 | Ichikawa .................... | 180/65.29 |
| 8,305,018 B2 * | 11/2012 | Okamura ...................... | 318/376 |
| 8,392,044 B2 * | 3/2013 | Thompson et al. ............. | 701/23 |
| 8,433,468 B2 * | 4/2013 | Johnson et al. ................. | 701/23 |
| 8,704,490 B2 * | 4/2014 | Minamiura .................... | 320/134 |
| 2004/0090195 A1 * | 5/2004 | Motsenbocker .............. | 318/109 |

(Continued)

FOREIGN PATENT DOCUMENTS

| JP | 2009-248913 A | 10/2009 |
|---|---|---|
| JP | 2011079447 A | 4/2011 |

*Primary Examiner* — McDieunel Marc
(74) *Attorney, Agent, or Firm* — Kenyon & Kenyon LLP

(57) ABSTRACT

An ECU executes a program including: a step of calculating a reference value Itag_b; a step of performing a first Pchg calculating process when a SOC at present is not in a predetermined range or speed V of a vehicle is smaller than a threshold value, or when a target value Itag is not less than the reference value Itag_b; and a step of performing a second Pchg calculating process when the SOC at present is in the predetermined range between SOC(1) and SOC(2) and the speed V of the vehicle is not less than the threshold value V(0), and when the target value Itag is smaller than the reference value Itag_b.

11 Claims, 11 Drawing Sheets

(56) References Cited

U.S. PATENT DOCUMENTS

| | | | |
|---|---|---|---|
| 2006/0048988 A1* | 3/2006 | Dreibholz et al. | 180/213 |
| 2007/0018608 A1 | 1/2007 | Okumura | |
| 2010/0087976 A1* | 4/2010 | Aridome et al. | 701/22 |
| 2011/0109274 A1* | 5/2011 | Minamiura | 320/134 |
| 2012/0029752 A1* | 2/2012 | Johnson et al. | 701/23 |
| 2012/0029753 A1* | 2/2012 | Johnson et al. | 701/23 |
| 2012/0029754 A1* | 2/2012 | Thompson et al. | 701/23 |
| 2012/0029755 A1* | 2/2012 | Johnson | 701/26 |
| 2012/0029756 A1* | 2/2012 | Johnson et al. | 701/26 |
| 2012/0222438 A1* | 9/2012 | Osaka et al. | 62/126 |
| 2013/0025248 A1* | 1/2013 | Kraft et al. | 56/10.2 A |
| 2013/0211625 A1* | 8/2013 | Thompson et al. | 701/2 |
| 2013/0211704 A1* | 8/2013 | Thompson et al. | 701/300 |

\* cited by examiner

VEHICLE AND VEHICLE CONTROL METHOD

CROSS REFERENCE TO RELATED APPLICATION

This is a national phase application based on the PCT International Patent Application No. PCT/JP2011/059903 filed on Apr. 22, 2011, the entire contents of which are incorporated herein by reference.

TECHNICAL FIELD

The present invention relates to charging control in a vehicle provided with a power storage device.

BACKGROUND ART

Regarding a technique of charging a power storage device of a vehicle during traveling, Japanese Patent Laying-Open No. 2009-248913 (PTD 1) discloses a technique of easing a restriction on charging power as vehicle speed becomes higher, for example.

CITATION LIST

Patent Document

PTD 1: Japanese Patent Laying-Open No. 2009-248913

SUMMARY OF INVENTION

Technical Problem

Depending on a type of battery used as the power storage device, an input time for an input current during charging may be restricted in accordance with a magnitude of the input current in order to suppress deterioration thereof. Hence, in the case where the power storage device is kept on being charged for a long time, a permissible value of the charging power may be restricted. As a result, regeneration energy cannot be possibly recovered efficiently during regenerative braking.

The present invention has an object to provide a vehicle and a vehicle control method, by each of which regeneration energy can be recovered efficiently during traveling of the vehicle.

Solution to Problem

A vehicle according to a certain aspect of the present invention includes: a lithium ion battery provided in the vehicle; a state of charge detecting unit for detecting a state of charge of the lithium ion battery; a speed detecting unit for detecting a speed of the vehicle; and a control unit for determining a charging request amount based on the speed of the vehicle, the state of charge of the lithium ion battery, and a predetermined relation, which corresponds to a characteristic of the lithium ion battery, between an input current and a permissible value of an input time, and controlling the vehicle based on the charging request amount determined.

Preferably, the control unit determines the charging request amount in accordance with a deviation between an integrated value of the input current and a target value of the integrated value, the target value being determined based on the input current and the predetermined relation.

More preferably, when the integrated value of the input current and the target value coincide with each other, the control unit decreases a magnitude of a charging power limiting value.

More preferably, when a magnitude of the deviation is larger than a threshold value, the control unit determines, as the charging request amount, a first request amount that is based on the state of charge of the lithium ion battery, and when the magnitude of the deviation is smaller than the threshold value, the control unit corrects the first request amount and determines the charging request amount.

More preferably, the control unit determines, as the charging request amount, a value lower than the first request amount by an amount corresponding to the magnitude of the deviation.

More preferably, the control unit calculates a correction factor corresponding to the magnitude of the deviation, and determines, as the charging request amount, a value obtained by multiplying the first request amount by the correction factor.

More preferably, the control unit calculates an offset amount corresponding to the magnitude of the deviation, changes a relation between the state of charge and the first request amount in accordance with the offset amount, and determines the charging request amount based on the state of charge and the relation changed.

More preferably, when the speed of the vehicle is higher than a predetermined speed, the control unit determines the charging request amount based on the state of charge of the lithium ion battery and the predetermined relation.

A vehicle control method according to another aspect of the present invention is a vehicle control method used for a vehicle provided with a lithium ion battery. The vehicle control method includes the steps of: detecting a state of charge of the lithium ion battery; detecting a speed of the vehicle; and determining a charging request amount based on the speed of the vehicle, the state of charge of the lithium ion battery, a predetermined relation, which corresponds to the lithium ion battery, between an input current and a permissible value of an input time, and controlling the vehicle so as to satisfy the charging request amount determined.

Advantageous Effects of Invention

According to the present invention, the integrated value of the current can be delayed in reaching the target value, by determining the charging/discharging request amount for the power storage device based on the target value of the integrated value of the current during charging of the power storage device. Accordingly, charging power is suppressed from being restricted due to the integrated value of the current reaching the target value. As a result, regeneration energy can be recovered efficiently during regenerative braking. Thus, there can be provided a vehicle and a vehicle control method, by each of which regeneration energy can be recovered efficiently during traveling of the vehicle.

DESCRIPTION OF EMBODIMENTS

Figure 1:
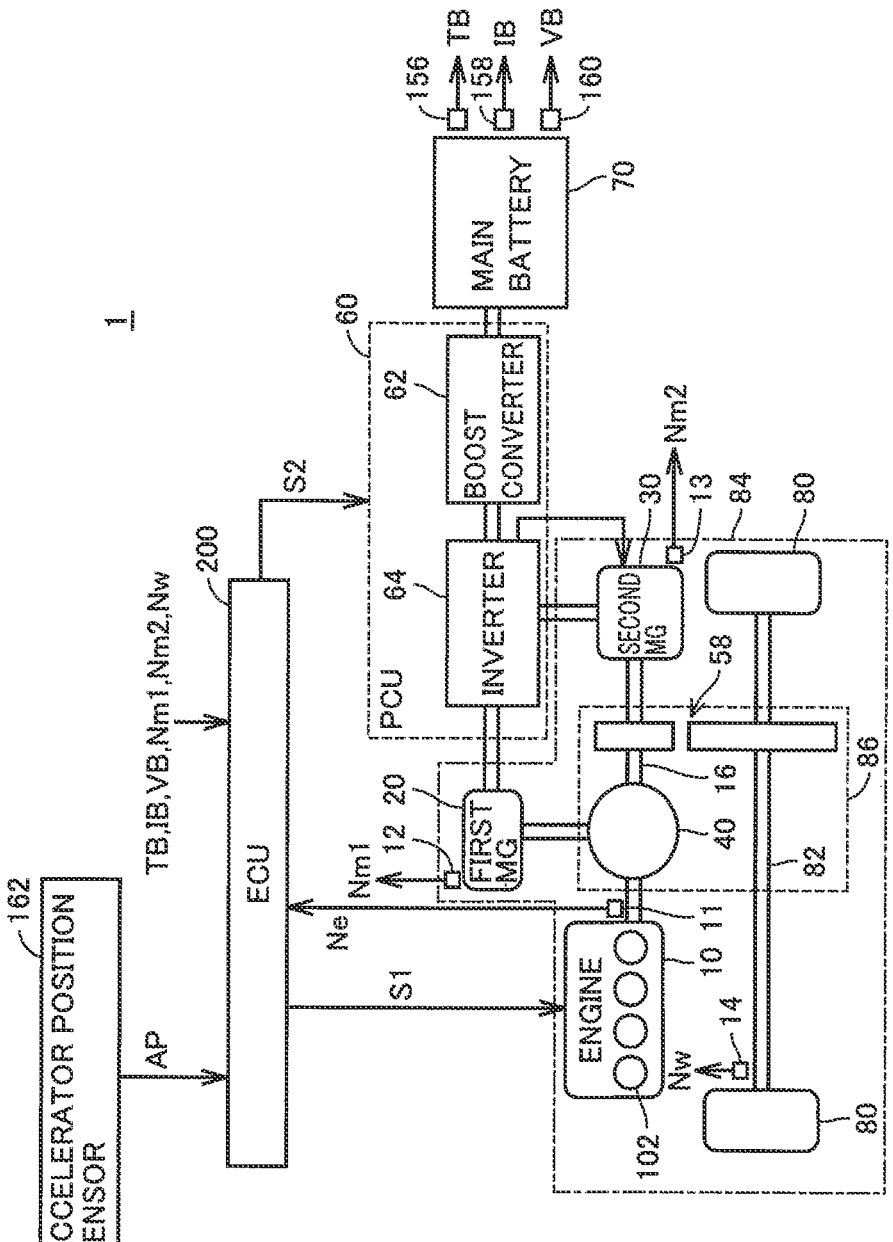
FIG. 1 is an entire block diagram of a vehicle according to the present embodiment.

In the following, an embodiment of the present invention will be described with reference to figures. In the following description, the same parts are denoted with the same reference numerals. Their designations and functions are also the same. Therefore, a detailed description thereof will not be repeated.

Referring to FIG. 1, an entire block diagram of a vehicle 1 according to the present embodiment will be illustrated. Vehicle 1 includes a PCU (Power Control Unit) 60, a main battery 70, a driving system 84, and an ECU (Electronic Control Unit) 200. Driving system 84 includes an engine 10, a first motor generator (hereinafter, referred to as "first MG") 20, a second motor generator (hereinafter, referred to as "second MG") 30, driving wheels 80, and a transmission 86. Transmission 86 is a driving power transmission device including a driving shaft 16, a power split device 40, a speed reducer 58, and a drive shaft 82.

Further, an engine speed sensor 1, a first resolver 12, a second resolver 13, a wheel speed sensor 14, a battery temperature sensor 156, a current sensor 158, a voltage sensor 160, and an accelerator position sensor 162 are connected to ECU 200.

This vehicle 1 travels using driving power output from at least one of engine 10 and second MG 30. Motive power generated by engine 10 is split into two paths by power split device 40. One of the two paths is a path for transmitting the motive power to driving wheels 80 via speed reducer 58. The other is a path for transmitting the motive power to first MG 20.

Each of first MG 20 and second MG 30 is a three-phase alternating-current rotating electrical machine, for example. First MG 20 and second MG 30 are driven by PCU 60.

First MG 20 has a function as a generator that generates electric power using the motive power supplied from engine 10 and split by power split device 10, so as to charge main battery 70 via PCU 60. Moreover, first MG 20 receives electric power from main battery 70 to rotate a crankshaft, which is an output shaft of engine 10. In this way, first MG 20 has a function as a starter that starts engine 10.

Second MG 30 has a function as a driving motor that provides driving power to driving wheels 80 using at least one of the electric power stored in main battery 70 and the electric power generated by first MG 20. Further, second MG 30 has a function as a generator for charging main battery 70 via PCU 60 using electric power generated by regenerative braking.

Examples of engine 10 include internal combustion engines such as a gasoline engine and a diesel engine. Engine 10 includes a plurality of cylinders 102. Further, engine 10 is provided with engine speed sensor 11 for detecting rotation speed (hereinafter, referred to as "engine speed") Ne of the crankshaft of engine 10. Engine speed sensor 11 transmits a signal indicating detected engine speed Ne to ECU 200.

Power split device 40 mechanically couples the following three elements to one another: driving shaft 16 for rotating driving wheels 80; an output shaft of engine 10; and the rotation shaft of first MG 20. Power split device 40 employs one of the above-described three elements as a reaction force element so as to achieve transmission of motive power between the other two elements. The rotation shaft of second MG 30 is coupled to driving shaft 16.

Power split device 40 is a planetary gear structure including a sun gear, pinion gears, a carrier, and a ring gear. The pinion gears are engaged with each of the sun gear and the ring gear. The carrier rotatably supports the pinion gears, and is coupled to the crankshaft of engine 10. The sun gear is coupled to the rotation shaft of first MG 20. The ring gear is coupled to the rotation shaft of second MG 30 and speed reducer 58 with driving shaft 16 being interposed therebetween.

Speed reducer 58 transmits motive power, which is received from power split device 40 or second MG 30, to driving wheels 80. Moreover, speed reducer 58 transmits reaction force, which is received from a road surface by driving wheels 80, to power split device 40 or second MG 30.

PCU 60 converts DC power stored in main battery 70 into AC power for driving first MG 20 and second MG 30. PCU 60 includes a boost converter 62 and an inverter 64, which are controlled based on a control signal S2 from ECU 200.

Boost converter 62 steps up the voltage of the DC power received from main battery 70, and sends it to inverter 64. Inverter 64 converts the output DC power of boost converter 62 into AC power, and sends it to first MG 20 and/or second MG 30. In this way, first MG 20 and/or second MG 30 are driven using the electric power stored in main battery 70. Further, inverter 64 converts AC power, which is generated by first MG 20 and/or second MG 30, into DC power and sends it to boost converter 62. Boost converter 62 steps down the voltage of the output DC power of inverter 64, and sends it to main battery 70. In this way, main battery 70 is charged with the electric power generated by first MG 20 and/or second MG 30. It should be noted that boost converter 62 may not be provided.

Main battery 70 is a power storage device and is a rechargeable DC power source. In the present embodiment, main battery 70 is illustrated as a lithium ion battery. It should be noted that main battery 70 in the present embodiment may be any power storage device as long as input time for input current during charging is restricted in accordance with a magnitude of the input current in the same manner as in the lithium ion battery, and is not particularly limited to the lithium ion battery.

Main battery 70 is provided with battery temperature sensor 150 for detecting battery temperature TB of main battery 70, current sensor 158 for detecting current IB of main battery 70, and voltage sensor 160 for detecting voltage VB of main battery 70.

Battery temperature sensor 156 transmits a signal indicating battery temperature TB to ECU 200. Current sensor 158 transmits a signal indicating current B to ECU 200. Voltage sensor 160 transmits a signal indicating voltage VB to ECU 200.

Accelerator position sensor 162 detects a stepping-on amount AP for the accelerator pedal (not shown). Accelerator position sensor 162 transmits a signal indicating stepping-on amount Ap for the accelerator pedal to ECU 200.

First resolver 12 is provided in first MG 20. First resolver 12 detects rotation speed Nm1 of first MG 20. First resolver 12 transmits a signal indicating detected rotation speed Nm1 to ECU 200. Second resolver 13 is provided in second MG 30. Second resolver 13 detects rotation speed Nm2 of second MG 20. Second resolver 13 transmits a signal indicating detected rotation speed Nm2 to ECU 200.

Wheel speed sensor 14 detects rotation speed Nw of driving wheels 80. Wheel speed sensor 14 transmits a signal indicating detected rotation speed Nw to ECU 200. ECU 200 calculates a vehicle speed V based on rotation speed Nw thus received. It should be noted that ECU 200 may calculate vehicle speed V based on rotation speed Nm2 of second MG 30 instead of rotation speed Nw.

ECU 200 generates a control signal S1 for controlling engine 10, and sends generated control signal S1 to engine 10. Further, ECU 200 generates control signal S2 for controlling PCU 60, and sends generated control signal S2 to PCU 60.

ECU 200 controls the entire hybrid system, i.e., charging/discharging state of main battery 70 as well as operation states of engine 10, first MG 20, and second MG 30 by controlling engine 10, PCU 60, and the like so as to achieve the most efficient traveling of vehicle 1.

When efficiency of engine 10 is bad as in starting of traveling or low-speed traveling, vehicle 1 configured as described above travels only using second MG 30 with engine 10 being nonoperational. Further, during normal traveling, power split device 40 splits the motive power of engine 10 into the motive powers for the two paths, for example. One of the motive powers is used to directly drive driving wheels 80. The other is used to drive first MG 20 so as to generate electric power. In doing so, ECU 200 causes second MG 30 to be driven using the generated electric power. By driving second MG 30 in this way, drive assistance for driving wheels 80 is attained.

During deceleration of vehicle 1, regenerative braking is performed with second MG 30, which operates according to the rotation of driving wheels 80, serving as a generator. The electric power recovered by the regenerative braking is stored in main battery 70. It should be noted that when the state of charge (hereinafter, referred to as "SOC") of the power storage device is decreased and therefore charging is particularly necessary, ECU 200 causes increase of output of engine 10 so as to increase an amount of electric power generated by first MG 20. In this way, the SOC of main battery 70 can be increased. Further, ECU 200 may also perform control, as required, to increase driving power supplied from engine 10, even during low-speed traveling. Examples of such a case include: a case where main battery 70 needs to be charged as described above; a case where an auxiliary device such as an air conditioner is driven; and a case where a temperature of coolant of engine 10 is increased to a predetermined temperature.

ECU 200 calculates requested power corresponding to stepping-on amount AP for the accelerator pedal. Further, ECU 200 calculates a charging/discharging request amount Pchg based on the SOC of main battery 70. In accordance with the requested power and charging/discharging request amount Pchg thus calculated, ECU 200 controls torque of each of first MG 20 and second MG 30 and controls output of engine 10.

Figure 2:
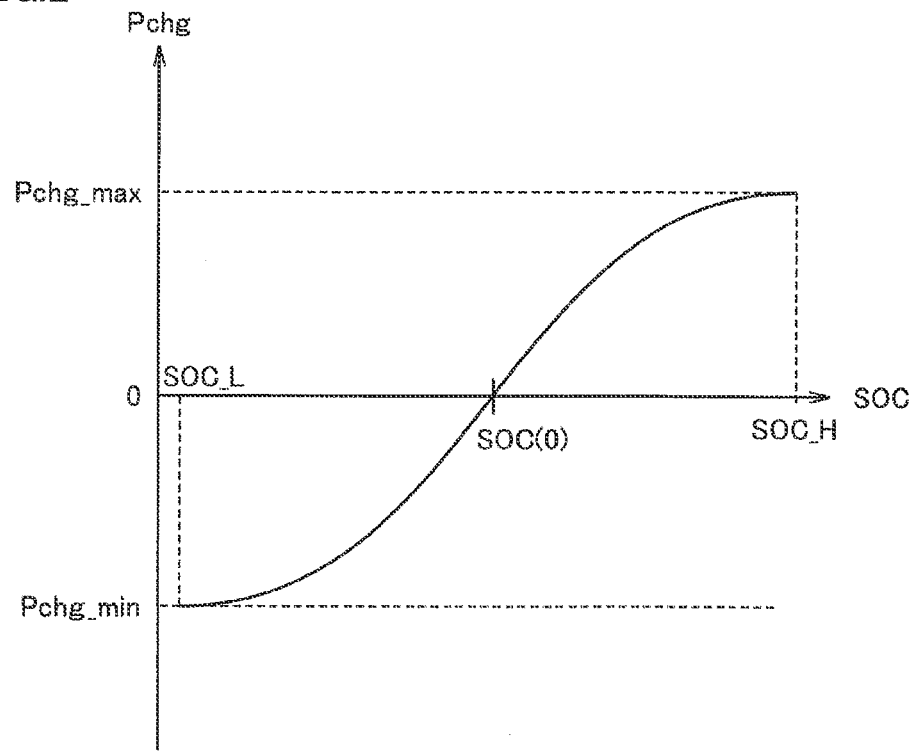
FIG. 2 shows a relation between an SOC and a charging/discharging request amount Pchg.

ECU 200 calculates charging/discharging request amount Pchg based on the SOC of main battery 70 at present and a map shown in FIG. 2, for example. The vertical axis of FIG. 2 represents charging/discharging request amount Pchg, and the horizontal axis of FIG. 2 represents the SOC of main battery 70. As shown in FIG. 2, in the case where the SOC of main battery 70 corresponds to a threshold value SOC(0), charging/discharging request amount Pchg is zero.

In the case where the SOC of main battery 70 is larger than threshold value SOC(0), charging/discharging request amount Pchg has a discharge-side value (positive value). Moreover, in the case where the SOC of main battery 70 is larger than threshold value SOC(0), an amount of change in charging/discharging request amount Pchg has a value of not less than zero. It should be noted that in the case where the SOC of main battery 70 is larger than threshold value SOC(0), the amount of change in charging/discharging request amount Pchg is decreased as the SOC is increased as shown in FIG. 2. In the case where the SOC has an upper limit value SOC_H, charging/discharging request amount Pchg has an upper limit value Pchg_max.

In the case where the SOC of main battery 70 is smaller than threshold value SOC(0), charging/discharging request amount Pchg has a charge-side value (negative value). In the case where the SOC of main battery 70 is larger than threshold value SOC(0), the amount of change in charging/discharging request amount Pchg has a value of not less than zero. It should be noted that in the case where the SOC of main battery 70 is smaller than threshold value SOC(0), the amount of change in charging/discharging request amount Pchg is decreased as the SOC is decreased as shown in FIG. 2. In the case where the SOC has a lower limit value SOC_L, charging/discharging request amount Pchg has a lower limit value Pchg min.

It should be noted that each of upper limit value SOC_H and lower limit value SOC_L of the SOC is a value defined by a type of battery or the like, and is adapted by experiment or design, for example. Further, upper limit value SOC_H of the SOC represents an SOC corresponding to the fully charged state of main battery 70.

Thus, when the SOC of main battery 70 is lower than threshold value SOC(0), ECU 200 causes charging/discharging request amount Pchg to increase in the direction of the charge side. On the other hand, when the SOC of main battery 70 is higher than threshold value SOC(0), ECU 200 causes charging/discharging request amount Pchg to increase in the direction of the discharge side. In this way, balance in the SOC of main battery 70 can be stabilized.

It should be noted that ECU 200 estimates the SOC based on current IB, voltage VB, and battery temperature TB of main battery 70. For example, ECU 200 may estimate an OCV (Open Circuit Voltage) based on current IB, voltage VB, and battery temperature TB, and may estimate the SOC of main battery 70 based on the OCV thus estimated. Alternatively, ECU 200 may estimate the SOC of main battery 70 by, for example, integrating charging current and discharging current for main battery 70.

Figure 3:
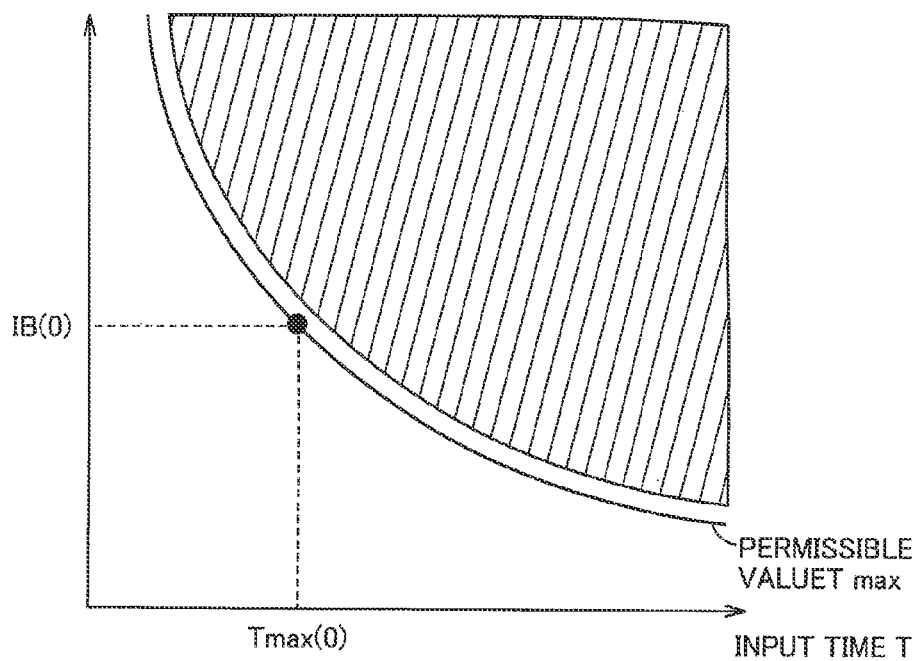
FIG. 3 shows a relation between an input current IB and a permissible value Tmax of an input time T.

Further, in main battery 70 in the present embodiment, input time T for current IB input during charging is restricted in accordance with the magnitude of current IB. For example, FIG. 3 shows a predetermined relation between current IB input to main battery 70 and a permissible value Tmax of input time T for current IB, in the case where main battery 70 is charged with a certain current. The vertical axis of FIG. 3 represents current TB, and the horizontal axis of FIG. 3 represents input time T.

As indicated by a solid line in FIG. 3, as current IB input to main battery 70 is smaller, permissible value Tmax of input time T becomes larger. On the other hand, as current IB input to main battery 70 is larger, permissible value Tmax of input time T becomes smaller. It should be noted that the relation between current IB and permissible value Tmax of input time T as indicated by the solid line of FIG. 3 is set to have a certain margin for a region indicated by oblique lines in FIG. 3. The region indicated by oblique lines in FIG. 3 represents an area in which deterioration of main battery 70 is facilitated.

In accordance with the relation between current IB and permissible value Tmax of input time T as indicated by the solid line of FIG. 3, Tmax(0) is specified as permissible value Tmax when current IB is IB(0), for example.

In the present embodiment, ECU 200 changes charging power limiting value Win during charging of main battery 70 such that input time T for current B does not exceed permissible value Tmax.

ECU 200 changes charging power limiting value Win during charging of main battery 70 based on a result of comparison between an integrated value IB_e of current IB and a target value Itag thereof, for example. More specifically, ECU 200 calculates integrated value IB_e of current IB by integrating current IB detected by current sensor 158 whenever a predetermined calculation cycle has passed since start of charging of main battery 70. In other words, ECU 200 calculates integrated value IB_e of current IB by adding, to a previous integrated value, a value obtained by multiplying current IB, which is detected by current sensor 158, by the predetermined calculation cycle.

ECU 200 calculates target value Itag based on calculated integrated value IB_e of current IB. For example, ECU 200 determines target value Itag such that a magnitude of target value Itag is decreased as a magnitude of integrated value IB_e of current IB is increased.

Specifically, ECU 200 calculates permissible value Tmax of input time T in accordance with current IB detected by current sensor 158 and FIG. 3 ECU 200 determines, as target value Ttag, a value obtained by subtracting integrated value IB_e of current IB from a product of detected current IB and permissible time Tmax.

When calculated integrated value tB_e of current IB exceeds target value Itag, ECU 200 decreases the magnitude of charging power limiting value Win. For example, when the magnitude of integrated value IB_e of current IB exceeds the magnitude of target value Itag, ECU 200 may determine an amount of decrease of the magnitude of charging power limiting value Win in accordance with a deviation between integrated value IB_e and target value Itag. As the deviation between integrated value IB_e and target value Itag becomes larger, ECU 200 may increase the amount of decrease of the magnitude of charging power limiting value Win.

Figure 4:
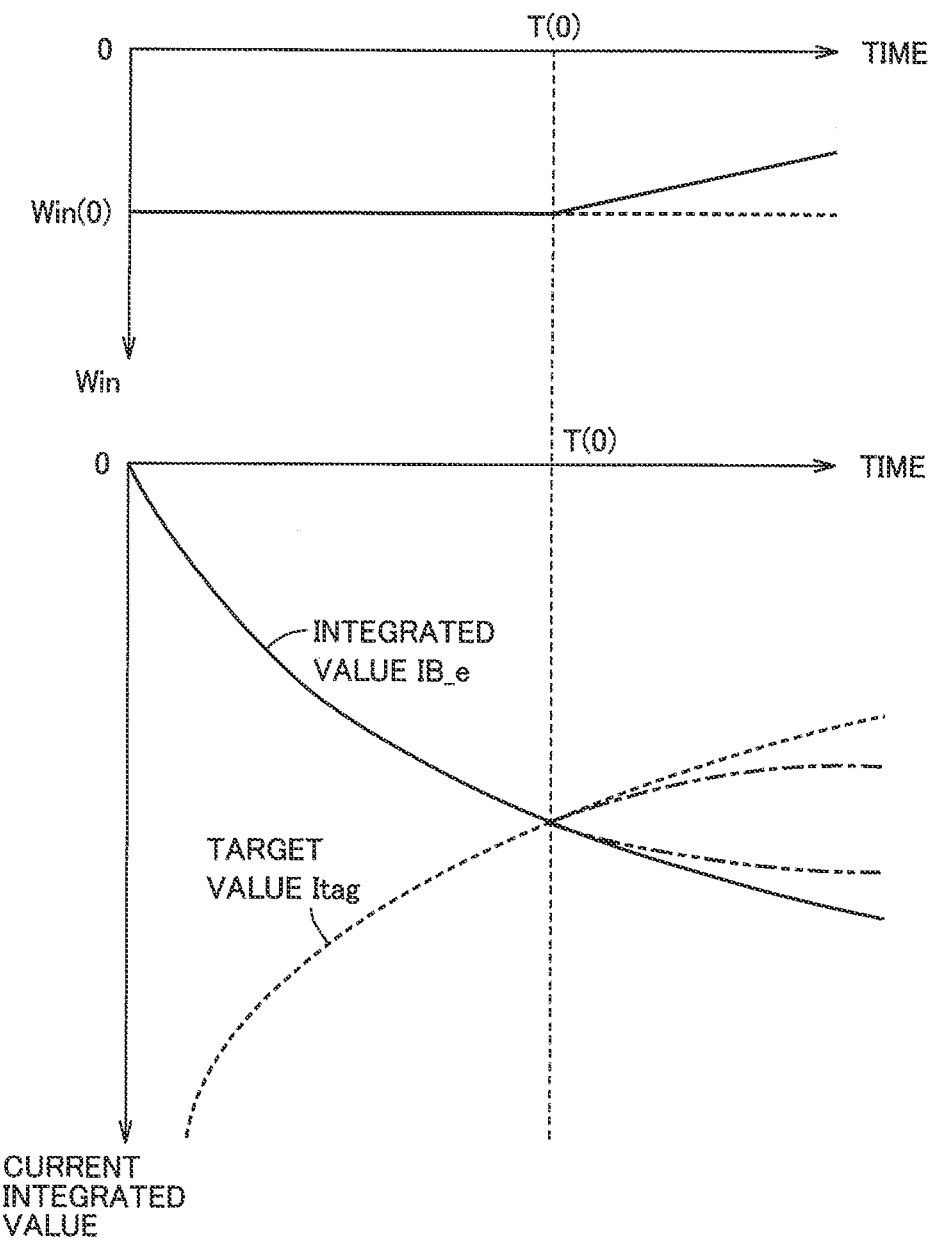
FIG. 4 is a timing chart showing changes in charging power limiting value Win, an integrated value of current IB, and a target value Itag.

Now, assume that main battery 70 is started to be charged because the SOC of main battery 70 has been decreased to fall below threshold value SOC(0) when charging power limiting value Win is Win(0) as shown in FIG. 4, for example. It should be noted that charging power limiting value Win is not restricted by a factor other than the result of comparison between integrated value IB_e and target value Itag.

For ease of description, regarding charging power limiting value Win, integrated value IB_e of current IB, and target value Itag in FIG. 4, it is assumed that the direction of arrow of the vertical axis of FIG. 4 (downward direction in the plane of sheet) represents a positive direction. The same applies to the description below.

When main battery 70 is started to be charged, integrated value IB_e of current IB is increased with passage of time. On the other hand, target value Itag is decreased due to the increase of integrated value IB_e of current IB with passage of time.

At a time T(0), integrated value IB_e of current IB and target value Itag coincide with each other, and thereafter integrated value IB_e of current IB starts to be increased to exceed target value Itag. Hence, after time T(0), charging power limiting value Win is changed to be decreased to fall below Win(0).

By decreasing charging power limiting value Win, current IB input to main battery 70 becomes smaller. Because current IB becomes smaller, an amount of increase of integrated value IB_e of current IB is decreased as compared with a case where charging power limiting value Win is not decreased (solid line in FIG. 4) as indicated by a chain double-dashed line in FIG. 4.

Due to the decrease of the amount of increase of integrated value IB_e of current IB, the amount of increase of target value Itag is decreased when charging power limiting value Win is not decreased (broken line in FIG. 4), as indicated by an alternate long and short dash line in FIG. 4.

In the case where ECU 200 operates as described above, charging power limiting value Win is decreased after a point of time at which integrated value IB_e of current IB and target value Itag coincide with each other. As a result, during regenerative braking, regeneration energy may not be recovered efficiently.

To address this, the present embodiment has such a feature that ECU 200 determines charging request amount Pchg based on speed V of vehicle 1, the SOC of main battery 70, and the predetermined relation between current IB input to main battery 70 and permissible value Tmax of input time T.

Figure 5:
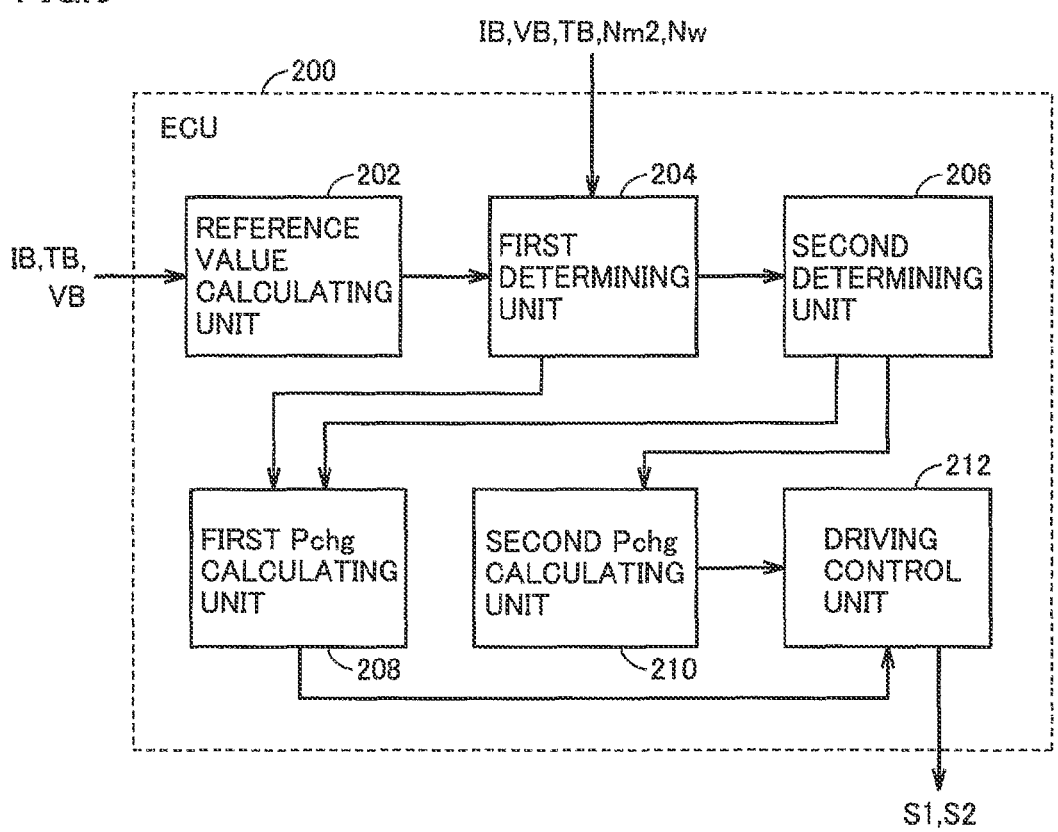
FIG. 5 is a function block diagram of an ECU provided in the vehicle according to the present embodiment.

FIG. 5 shows a function block diagram of ECU 200 provided in vehicle 1 according to the present embodiment. ECU 200 includes a reference value calculating unit 202, a first determining unit 204, a second determining unit 206, a first Pchg calculating unit 208, a second Pchg calculating unit 210, and a driving control unit 212.

Reference value calculating unit 202 calculates a reference value Itag_b for target value Itag. Reference value Itag_b is a threshold value for starting correction of charging/discharging request amount Pchg. Reference value calculating unit 202 calculates reference value Itag_b when main battery 70 is charged, for example.

When vehicle 1 is in a state in which recovery energy needs to be recovered efficiently, reference value calculating unit 202 calculates reference value Itag_b such that reference value Itag_b becomes higher than that in the case where vehicle 1 is in a state other than the foregoing state. Reference value calculating unit 202 may calculate reference value Itag_b based on the SOC of main battery 70 and a predetermined map, for example.

It should be noted that the predetermined map may be set such that as the SOC of main battery 70 is lower, reference value Itag_b becomes higher, and such that as the SOC of main battery 70 is higher, reference value Itag_b becomes lower than that in the case where the SOC of main battery 70 is lower, for example. Alternatively, instead of the predetermined map, a table, a mathematical formula, or the like may be employed.

First determining unit 204 determines whether or not the SOC of main battery 70 is in a predetermined range and speed V of vehicle 1 is not less than threshold value V(0). For example, when the SOC of main battery 70 is not less than a predetermined value SOC(1) and is not more than a predetermined value SOC(2) (>SOC(1)), first determining unit 204 determines that the SOC of main battery 70 is in the predetermined range. It should be noted that SOC(1) may have a value of not less than SOC_L described above. Meanwhile, SOC(2) may have a value of not more than SOC_H described above.

Threshold value V(0) is a value adapted by an experiment or the like, and represents speed of vehicle 1 with which a predetermined amount of energy or more can be recovered during regenerative braking of vehicle 1. Threshold value V(0) may be determined based on kinetic energy of vehicle 1 and/or potential energy of vehicle 1, for example.

Threshold value V(0) may be set in accordance with an inclination of a road surface on which vehicle 1 is traveling. For example, threshold value V(0) may be set to be lower as vehicle 1 is traveling on a road surface of downhill with a larger inclination. It should be noted that ECU 200 may detect the inclination of the road surface using a 0 sensor or the like, for example. Alternatively, ECU 200 may obtain the inclination of the road surface based on location information from a navigation system.

Alternatively, threshold value V(0) may be set in accordance with the height of the road surface on which vehicle 1 is traveling. For example, threshold value V(0) may be set to be lower as the height of the road surface on which vehicle 1 is traveling is higher. It should be noted that ECU 200 may obtain the height of the road surface based on location information from a navigation system, for example.

It should be noted that first determining unit 204 may bring a first determination flag into ON state when the SOC of main battery 70 is in the predetermined range and speed V of vehicle 1 is not less than threshold value V(0), for example.

When first determining unit 204 determines that the SOC of main battery 70 is in the predetermined range and speed V of vehicle 1 is not less than threshold value V(0), second determining unit 206 determines whether or not target value Itag is smaller than reference value Itag_b calculated by reference value calculating unit 202.

It should be noted that when the first determination flag is in ON state, second determining unit 206 may determine whether or not target value Itag is smaller than reference value Itag_b, and when target value Itag is smaller than reference value Itag_b, second determining unit 206 may bring a second determination flag into ON state, for example.

When second determining unit 206 determines that target value Itag is not less than reference value Itag_b, first Pchg calculating unit 208 calculates charging/discharging request amount Pchg based on the SOC of main battery 70 and the predetermined map. The predetermined map is a map indicating the relation between the SOC and charging/discharging request amount Pchg as shown in FIG. 2.

It should be noted that when the second determination flag is in OFF state, first Pchg calculating unit 208 may calculate charging/discharging request amount Pchg based on the SOC of main battery 70 and the predetermined map, for example.

When second determining unit 206 determines that target value Itag is smaller than reference value Itag_b, second Pchg calculating unit 210 calculates charging/discharging request amount Pchg in accordance with a deviation ΔItag between target value Itag and reference value Itag_b.

Second Pchg calculating unit 210 calculates a tentative charging/discharging request amount Pchg' in accordance with the SOC at present and the predetermined map shown in FIG. 2. Second Pchg calculating unit 210 calculates, as final charging/discharging request amount Pchg, a value obtained by multiplying calculated charging/discharging request amount Pchg' by a correction factor C (=Pchg'×C).

Figure 6:
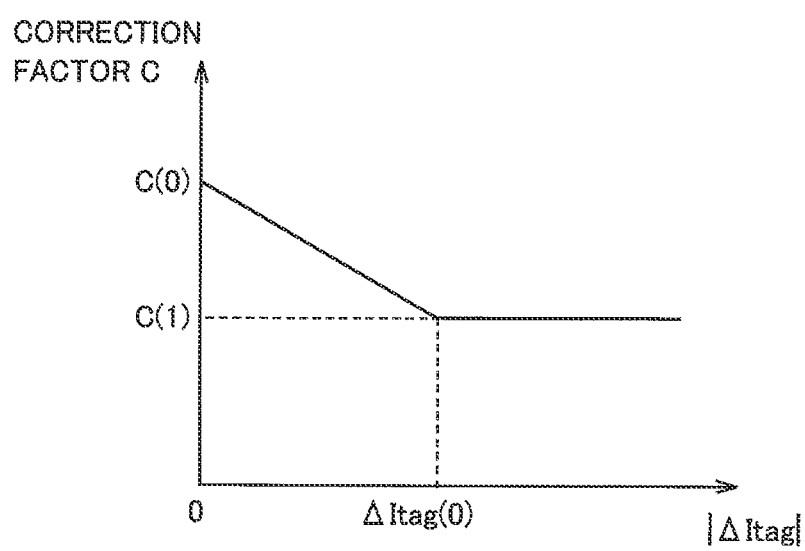
FIG. 6 shows a relation between a magnitude of ΔItag and a correction factor.

Second Pchg calculating unit 210 determines correction factor C based on a magnitude (absolute value) of deviation ΔItag between target value Itag and reference value Itag_b as well as a map shown in FIG. 6. The vertical axis of FIG. 6 represents correction factor C, whereas the horizontal axis of FIG. 6 represents the magnitude of deviation ΔItag.

As shown in FIG. 6, when the magnitude of deviation ΔItag is zero, correction factor C is set to be C(0). In the present embodiment, it is assumed that C(0) is "1", but C(0) is not particularly limited to this as long as C(0) is at least a value of not more than "1".

Meanwhile, when the magnitude of deviation ΔItag is larger than threshold value ΔItag(0), the correction factor is set to be C(1). C(1) is a value smaller than C(0). When the magnitude of deviation ΔItag is changed between zero and threshold value ΔItag(0) correction factor C is changed between C(0) and C(1) such that the magnitude of deviation ΔItag and correction factor C are in a proportional relation. It should be noted that when the magnitude of deviation ΔItag is not more than threshold value ΔItag(0), correction factor C may be set to be C(0). Further, the relation between deviation ΔItag and correction factor C is not limited to a linear relation such as the proportional relation, and may be a nonlinear relation.

It should be noted that second Pchg calculating unit 210 may determine final charging/discharging request amount Pchg when the second determination flag is in ON state, for example.

Driving control unit 212 controls PCU 60 and engine 10 in accordance with requested power that is based on stepping-on amount AP for the accelerator pedal as well as final charging/discharging request amount Pchg determined by one of first Pchg calculating unit 208 and second Pchg calculating unit 210. Driving control unit 212 generates control signal S1 for controlling engine 10, and generates control signal S2 for controlling PCU 60. Driving control unit 212 sends generated control signal S1 to engine 10. Driving control unit 212 sends generated control signal S2 to PCU 60.

In the present embodiment, it is assumed that reference value calculating unit 202, first determining unit 204, second determining unit 206, first Pchg calculating unit 208, second Pchg calculating unit 210, and driving control unit 212 are components functioning as software and implemented by a CPU of ECU 200 executing a program stored in a memory, but they may be implemented by hardware. It should be noted that such a program is recorded in a storage medium, which is provided in a vehicle.

Figure 7:
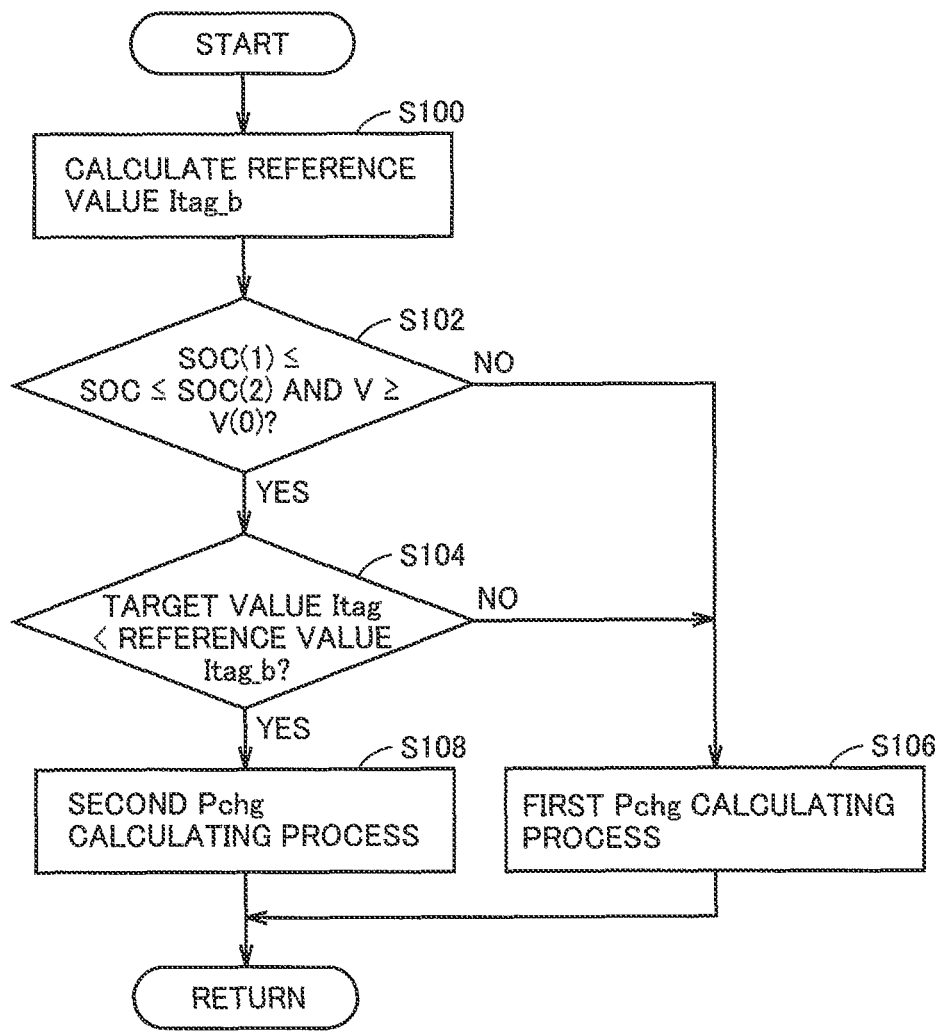
FIG. 7 is a flowchart showing a control structure of a program executed by the ECU provided in the vehicle according to the present embodiment.

Referring to FIG. 7, the following describes a control structure of the program executed by ECU 200 in vehicle 1 according to the present embodiment.

In a step (hereinafter, the word "step" will be abbreviated as "S") 100, ECU 200 calculates reference value Itag_b based on the SOC of main battery 70. Reference value Itag_b is calculated based on the SOC of main battery 70 in the above-described manner, so that detailed description thereof will not be repeated.

In S102, ECU 200 determines whether or not the SOC of main battery 70 is in the predetermined range of not less than threshold value SOC(1) and not more than threshold value SOC(2) and speed V of vehicle 1 is not less than threshold value V(0). When the SOC of main battery 70 is in the predetermined range and speed V of vehicle is not less than threshold value V(0) (YES in S102), the process proceeds to S104. Otherwise (NO in S102), the process proceeds to S106.

In S104, ECU 200 determines whether or not target value Itag is smaller than reference value Itag_b. When target value Itag is smaller than reference value Itag_b (YES in S104), the process proceeds to S108. Otherwise (NO in S104), the process proceeds to S106.

In S106, ECU 200 performs a first Pchg calculating process. ECU 200 calculates final charging/discharging request amount Pchg in accordance with the SOC of main battery 70 at present and the predetermined map shown in FIG. 2. A specific calculation method is the same as the calculation method performed by first Pchg calculating unit 208 described above and is therefore not described in detail repeatedly.

In S108, ECU 200 performs a second Pchg calculating process. ECU 200 calculates tentative charging/discharging request amount Pchg' in accordance with the SOC of main battery 70 at present and the predetermined map shown in FIG. 2. ECU 200 calculates correction factor C in accordance with deviation ΔItag using the map shown in FIG. 6. ECU 200 determines, as final charging/discharging request amount Pchg, a value obtained by multiplying tentative charging/discharging request amount Pchg' by correction factor C.

Figure 8:
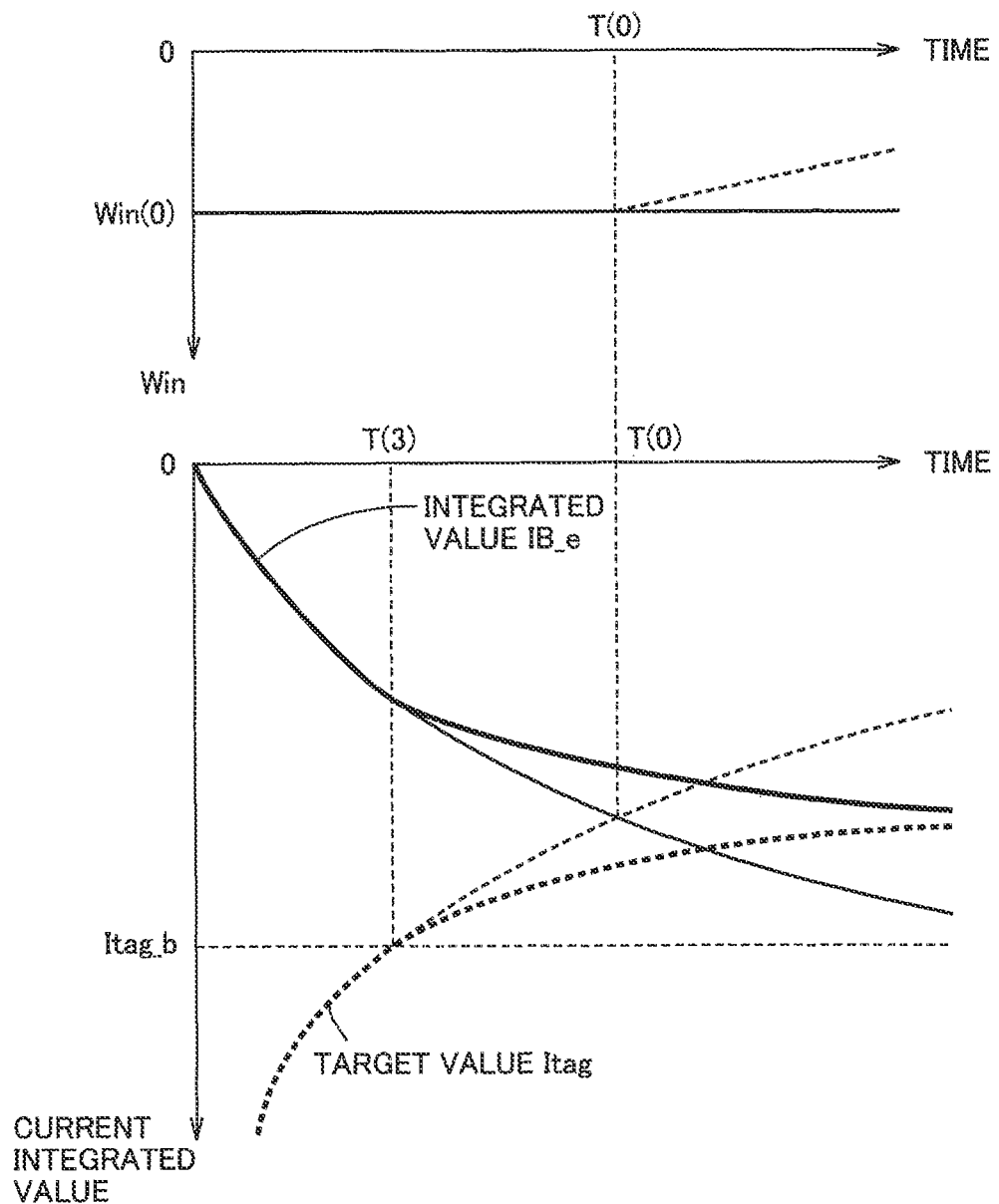
FIG. 8 is a timing chart showing an operation of the ECU provided in the vehicle according to the present embodiment.
Figure 9:
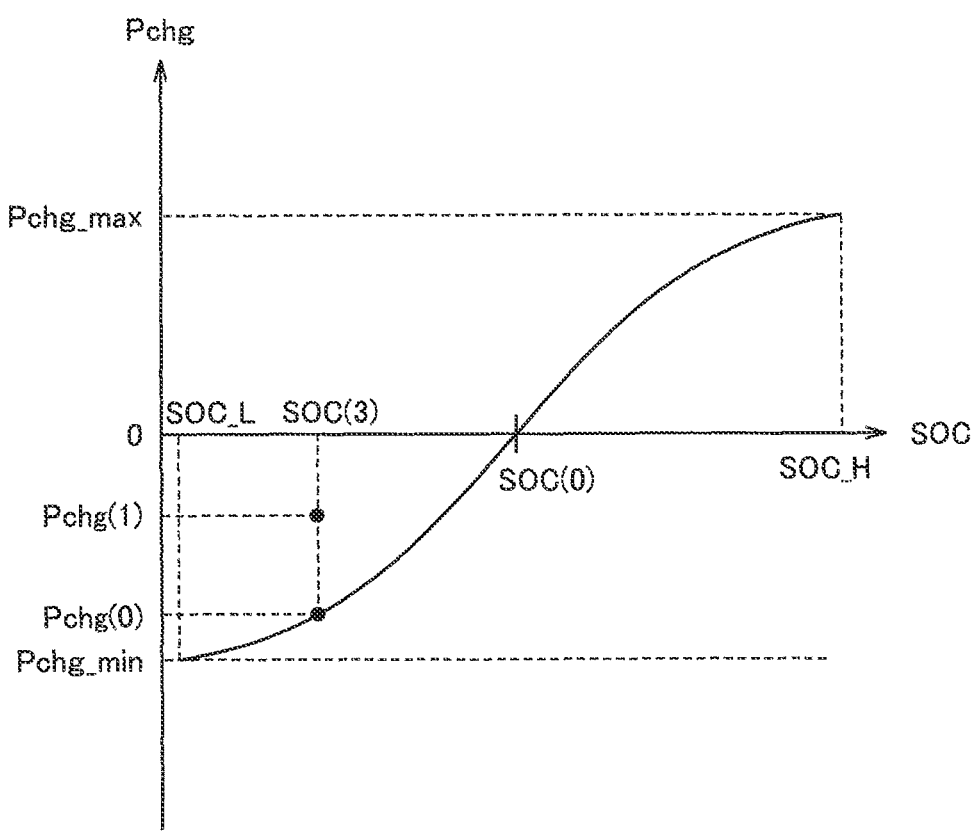
FIG. 9 is a first diagram showing a relation between the SOC and corrected charging/discharging request amount Pchg.

Referring to FIG. 8 and FIG. 9, the following describes an operation of ECU 200 of the vehicle according to the present embodiment based on the above-described structure and flowchart.

Now, assume that main battery 70 is started to be charged because the SOC of main battery 70 has been decreased to fall below threshold value SOC(0) when charging power limiting value Win is Win(0) as shown in FIG. 8, for example. It should be noted that charging power limiting value Win is not restricted by a factor other than the result of comparison between integrated value IB_e and target value Itag.

When main battery 70 is started to be charged, integrated value IB_e of current IB is increased with passage of time. On the other hand, target value Itag is decreased due to the increase of integrated value IB_e of current IB with passage of time.

On this occasion, reference value Itag_b is calculated based on the SOC of main battery 70 (S100). Further, when the SOC of main battery 70 at present is not in the predetermined range (i.e., the SOC at present is smaller than SOC(1) or is larger than SOC(2)), or when speed V of vehicle 1 is lower than threshold value V(0) (NO in S102), the first Pchg calculating process is performed (S106). Further, before a time T(3), target value Itag is not less than reference value Itag_b (NO in S104), so that the first Pchg calculating process is performed (S106).

When the first Pchg calculating process is performed, final charging/discharging request amount Pchg is determined in accordance with the SOC of main battery 70 at present and a predetermined map shown in FIG. 9.

For example, as shown in FIG. 9, when the SOC at present is SOC(3), Pchg(0) is determined as final charging/discharging request amount Pchg. It should be noted that a relation between the SOC and charging/discharging request amount Pchg as indicated by a solid line in FIG. 9 is the same as the relation between the SOC and charging/discharging request amount Pchg as indicated by the solid line in FIG. 2. Therefore, a detailed description thereof will not be repeated.

When the SOC of main battery 70 at present is in the predetermined range (i.e., the SOC at present is not less than SOC(1) and not more than SOC(2) and speed V of vehicle 1 is not less than threshold value V(0)) (YES in S102), it is determined whether or not target value Itag is smaller than reference value Itag_b (S104).

Meanwhile, after time T(3), target value Itag is smaller than reference value Itag_b (YES in S104), so that the second Pchg calculating process is performed (S108).

When the second Pchg calculating process is performed, correction factor C is determined based on the magnitude of deviation ΔItag and the map shown in FIG. 6. Further, tentative charging/discharging request amount Pchg' is determined in accordance with the SOC of main battery 70 at present and the predetermined map shown in FIG. 9. A value obtained by multiplying tentative charging/discharging request amount Pchg' by determined correction factor C is determined as final charging/discharging request amount Pchg.

For example, assume that the SOC at present is SOC(3) as shown in FIG. 9. On this occasion, correction factor C is C(2). It should be noted that C(2) is a value smaller than C(0) and larger than C(1). Tentative charging/discharging request amount Pchg(0) is calculated in accordance with SOC(3), which is the SOC at present, and the predetermined map shown in FIG. 9. Further, a value Pchg(1) (=C(2)×Pchg(0)) obtained by multiplying correction factor C(2) by charging/discharging request amount Pchg(0) is determined as final charging/discharging request amount Pchg.

As shown in FIG. 9, final charging/discharging request amount Pchg(1) calculated by performing the second Pchg calculating process has a value smaller in magnitude than that of final charging/discharging request amount Pchg(0) calculated by performing the first Pchg calculating process when the SOC at present is the same.

Accordingly, the magnitude of current IB becomes smaller during charging of main battery 70, with the result that an amount of change (amount of increase) in integrated value IB_e of current IB with passage of time is decreased as compared with a case where the second Pchg calculating process is not performed (thin solid line in FIG. 8), as indicated by a thick solid line in FIG. 8. The decrease in the amount of increase of integrated value IB_e results in decrease of an amount of change (amount of decrease) in target value Itag with passage of time as compared with a case where the second Pchg calculating process is not performed (thin broken line in FIG. 8), as indicated by a thick broken line in FIG. 8.

As a result, a point of time at which integrated value IB_e and target value Itag coincide with each other is delayed relative to the point of time (time T(0)) at which integrated value IB_e and target value Itag would have coincided with each other if the second Pchg calculating process were not performed.

Therefore, the magnitude of charging power limiting value Win is suppressed from being restricted at time T(0). In other words, Win(0) is maintained as charging power limiting value Win in a period of time from time T(0) to the point of time at which integrated value IB_e and target value Itag coincide with each other. Accordingly, regeneration energy can be recovered efficiently during regenerative braking.

In this way, according to the vehicle in the present embodiment, charging request amount Pchg is determined based on speed V of vehicle 1, the SOC of main battery 70, and the predetermined relation between current IB input to main battery 70 and permissible value Tmax of input time T. Accordingly, the point of time at which integrated value IB_e of current IB and target value Itag coincide with each other can be delayed. The delay of the point of time at which integrated value IB_e and target value hag coincide with each other leads to suppression of decrease of the magnitude of charging power limiting value Win. As a result, regeneration energy can be recovered efficiently during regenerative braking.

Thus, there can be provided a vehicle and a vehicle control method, by each of which regeneration energy can be recovered efficiently during traveling of the vehicle.

In the present embodiment, it has been illustrated that ECU 200 determines, as target value Itag, the value obtained by subtracting integrated value IB_e of current IB from the product of current IB and permissible value Tmax of input time T, but the method for determining target value Itag is not limited to the method described above. For example, ECU 200 may determine, as target value Itag, a value obtained by adding (or subtracting) a predetermined value to (from) the value obtained by subtracting integrated value IB_e of current IB from the product of current IB and permissible value Tmax of input time T. Alternatively, ECU 200 may determine, as target value Itag, a value obtained by multiplying, by a predetermined factor, the value obtained by subtracting integrated value IB_e of current IB from the product of current IB and permissible value Tmax of input time T.

Further, in the present embodiment, it has been illustrated that reference value Itag_b is set using the predetermined map such that as the SOC of main battery 70 is lower, reference value Itag_b becomes higher, and such that as the SOC of main battery 70 is higher, reference value Itag_b becomes lower than that in the case where the SOC of main battery 70 is lower. As reference value Itag_b becomes higher, the second Pchg calculating process cart be performed at an earlier point of time. Accordingly, the point of time at which integrated value IB_e and target value Itag coincide with each other can be further delayed as compared with a case where reference value Itag_b is low. Accordingly, a larger amount of regeneration energy can be recovered during regenerative braking.

Further, in the present embodiment, it has been illustrated that ECU 200 determines final charging/discharging request amount Pchg in the following manner. That is, ECU 200 determines correction factor C in accordance with deviation ΔItag. ECU 200 calculates tentative charging/discharging request amount Pchg' in accordance with the SOC of main battery 70 at present, the predetermined map shown in FIG. 9. ECU 200 determines final charging/discharging request amount Pchg by multiplying charging/discharging request amount Pchg' by correction factor C.

However, the method for determining final charging/discharging request amount Pchg by correcting tentative charging/discharging request amount Pchg' is not limited to multiplying tentative charging/discharging request amount Pchg' by correction factor C.

Figure 10:
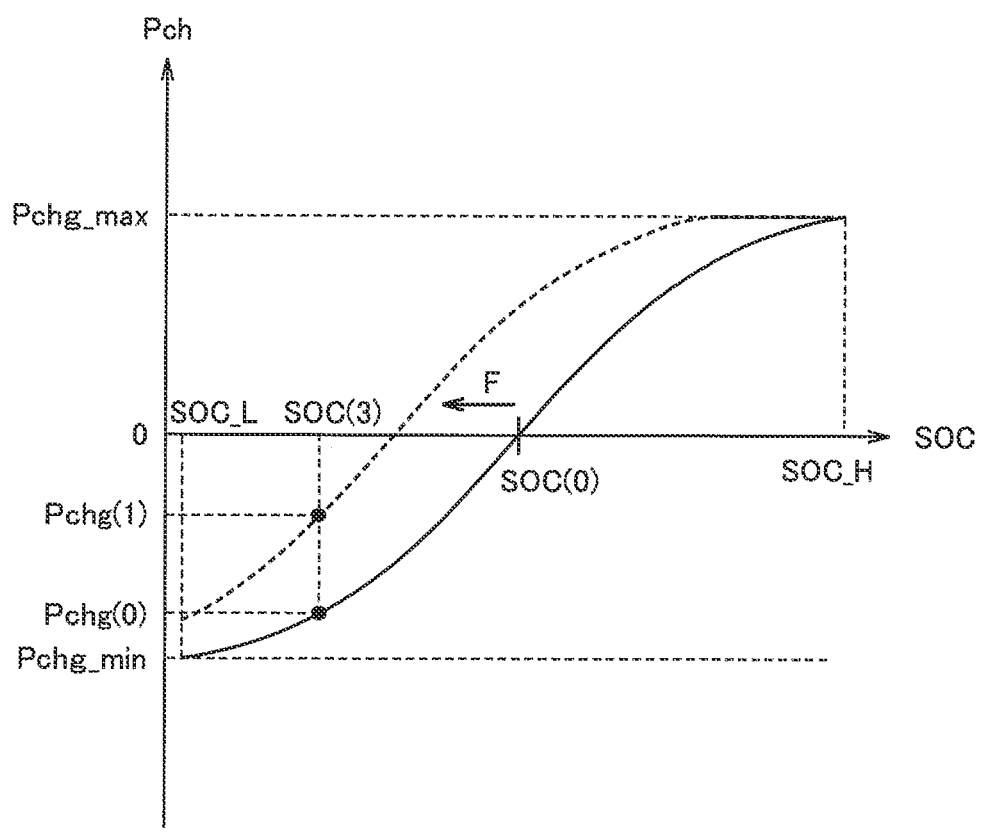
FIG. 10 is a second diagram showing the relation between the SOC and corrected charging/discharging request amount Pchg.

For example, ECU 200 may calculate an offset amount F of the map shown in FIG. 9 based on deviation ΔItag, for example. As shown in FIG. 10, ECU 200 may specify a curve indicated by a broken line of FIG. 10 by moving a curve indicated by a solid line of FIG. 10 in a direction of decrease of SOC by calculated offset amount F. Based on the SOC of main battery 70 at present and the specified curve indicated by the broken line of FIG. 10, ECU 200 may calculate final charging/discharging request amount Pchg.

For example, when the SOC of main battery 70 at present is SOC(3), Pchg(1) is calculated as final charging/discharging request amount Pchg using the curve indicated by the broken line of FIG. 10.

Figure 11:
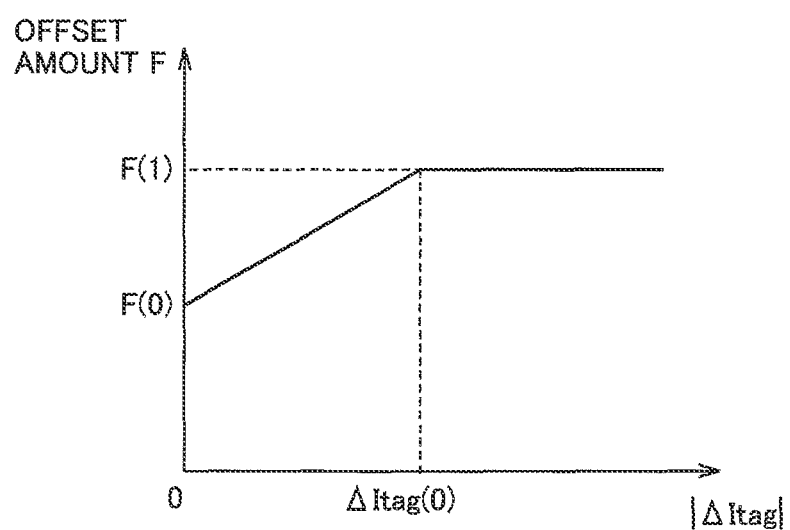
FIG. 11 shows a relation between a magnitude of ΔItag and an offset amount.

ECU 200 determines offset amount F based on the magnitude of deviation ΔItag and a predetermined map shown in FIG. 11, for example. The vertical axis of FIG. 11 represents offset amount F, whereas the horizontal axis of FIG. 11 represents the magnitude of ΔItag. Further, the positive direction of offset amount F corresponds to a direction in which the SOC is decreased.

As shown in FIG. 11, when the magnitude of deviation ΔItag is zero, offset amount F is F(0). In the present embodiment, it is assumed that F(0) is "0", but F(0) is not particularly limited to this as long as F(0) at least has a value of not less than "0".

Meanwhile, when the magnitude of deviation ΔItag is larger than threshold value ΔItag(0), offset amount F becomes F(1). F(1) has a value larger than F(0). When the magnitude of deviation ΔItag is changed between zero and threshold value ΔItag(0), offset amount F is defined to be changed between F(0) and F(1) such that the magnitude of deviation ΔItag and offset amount F are in a proportional relation. It should be noted that when the magnitude of deviation ΔItag is not more than threshold value ΔItag(0), offset amount F may be set to be F(0). Further, the relation between deviation ΔItag and offset amount F is not limited to a linear relation such as the proportional relation, and may be a nonlinear relation.

Figure 12:
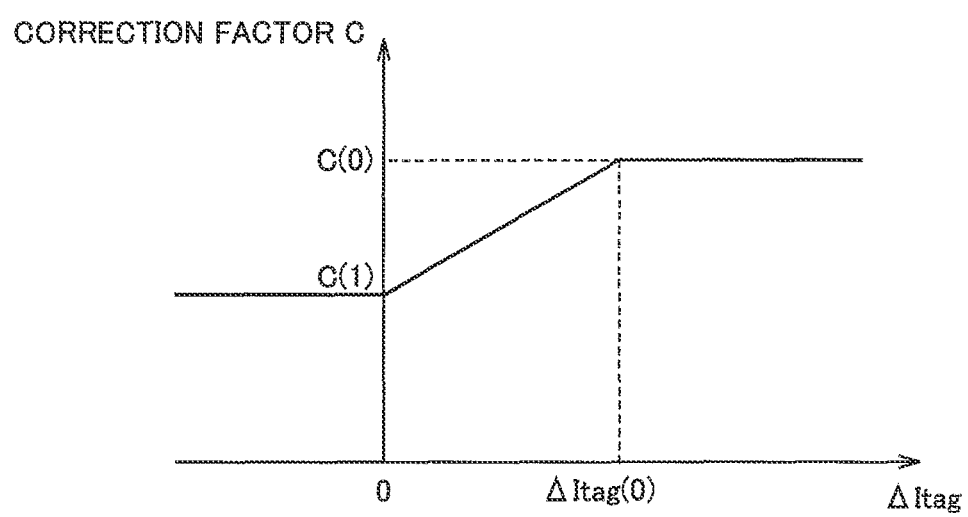
FIG. 12 shows a relation between ΔItag and the correction factor.

Further, in the present embodiment, it has been illustrated that ECU 200 performs the first Pchg calculating process when target value Itag is not less than reference value Itag_b and performs the second Pchg calculating process when target value Itag is smaller than reference value Itag_b, but ECU 200 may calculate final charging/discharging request amount Pchg using deviation ΔItag and a predetermined map shown in FIG. 12 during charging of main battery 70, for example. In the predetermined map shown in FIG. 12, when deviation ΔItag is smaller than zero (i.e., target value Itag is smaller than reference value Itag), correction factor C becomes C(1). In the predetermined map, when deviation ΔItag is larger than ΔItag(0), the correction factor becomes C(0). Further, in the predetermined map, when deviation ΔItag is changed between zero and threshold value ΔItag(0), correction factor C is defined to be changed between C(1) and C(0) such that deviation ΔItag and correction factor C are in a proportional relation. Further, the relation between deviation ΔItag and correction factor C is not limited to a linear relation such as the proportional relation, and may be a nonlinear relation.

In this way, increase of integrated value IB_e of current IB can be suppressed before target value Itag becomes smaller than reference value Itag_b, thereby delaying the point of time at which target value Itag and integrated value IB_e coincide with each other.

It should be noted that FIG. 1 illustrates exemplary vehicle 1 having front wheels serving as driving wheels 80, but the present invention is not limited to such a driving method. For example, vehicle 1 may have rear wheels serving as the driving wheels. Alternatively, vehicle 1 may not be provided with first MG 20 or second MG 30 of FIG. 1. Alternatively, vehicle 1 may be a vehicle in which second MG 30 of FIG. 1 is coupled to a driving shaft for driving rear wheels instead of driving shaft 16 for the front wheels. Further, a transmission structure may be provided between driving shaft 16 and speed reducer 58 or between driving shaft 16 and second MG 30.

Further, vehicle 1 may be any vehicle provided with a lithium ion battery, and is not particularly limited to a hybrid vehicle. For example, vehicle 1 may be an electric vehicle, or a vehicle having an engine only as a motive power source.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: vehicle; 10: engine; 11: engine speed sensor: 12: first resolver; 13: second resolver; 14: wheel speed sensor; 16:

driving shaft; 20: first MG: 30: second MG; 40: power split device; 58: speed reducer; 62: boost converter; 64: inverter; 70: main battery; 80: driving wheel; 82: drive shaft; 84: driving system; 86: transmission; 102: cylinder; 156: battery temperature sensor; 158: current sensor; 160: voltage sensor; 162: accelerator position sensor; 202: reference value calculating unit; 204: first determining unit; 206: second determining unit; 208: first Pchg calculating unit: 210: second Pchg calculating unit; 212: driving control unit.

The invention claimed is:

1. A vehicle comprising:
a lithium ion battery provided in the vehicle;
a state of charge detecting unit for detecting a state of charge of said lithium ion battery;
a speed detecting unit for detecting a speed of the vehicle; and
a control unit for determining a charging request amount based on said state of charge of said lithium ion battery, and a predetermined relation, which corresponds to a characteristic of said lithium ion battery, between an input current and a permissible value of an input time when said speed of the vehicle is larger than a threshold value of said speed of the vehicle with which a predetermined amount of regeneration energy is able to be recovered during regenerative braking.

2. The vehicle according to claim 1, wherein said control unit determines said charging request amount in accordance with a deviation between an integrated value of said input current and a target value of said integrated value, said target value being determined based on said input current and said predetermined relation.

3. The vehicle according to claim 2, wherein when said integrated value of said input current and said target value coincide with each other, said control unit decreases a magnitude of a charging power limiting value.

4. The vehicle according to claim 2, wherein when a magnitude of said deviation is larger than a threshold value, said control unit determines, as said charging request amount, a first request amount that is based on the state of charge of said lithium ion battery, and when the magnitude of said deviation is smaller than said threshold value, said control unit corrects said first request amount and determines said charging request amount.

5. The vehicle according to claim 4, wherein said control unit determines, as said charging request amount, a value lower than said first request amount by an amount corresponding to the magnitude of said deviation.

6. The vehicle according to claim 5, wherein said control unit calculates a correction factor corresponding to the magnitude of said deviation, and determines, as said charging request amount, a value obtained by multiplying said first request amount by said correction factor.

7. The vehicle according to claim 5, wherein said control unit calculates an offset amount corresponding to the magnitude of said deviation, changes a relation between said state of charge and said first request amount in accordance with said offset amount, and determines said charging request amount based on said state of charge and said relation changed.

8. The vehicle according to claim 1, wherein when said speed of the vehicle is higher than a predetermined speed, said control unit determines said charging request amount based on said state of charge of said lithium ion battery and said predetermined relation.

9. The vehicle according to claim 1, wherein when the threshold value of the speed of the vehicle is set at a lower value as an inclination of a road surface on a downhill is larger.

10. The vehicle according to claim 1, wherein the threshold value of the speed of the vehicle is set at a lower value as a height of a road surface is higher.

11. A vehicle control method used for a vehicle provided with a lithium ion battery, comprising the steps of:
detecting by a processor a state of charge of said lithium ion battery;
detecting by a processor a speed of the vehicle; and
determining by a processor a charging request amount based on said speed of the vehicle, said state of charge of said lithium ion battery, a predetermined relation, which corresponds to said lithium ion battery, between an input current and a permissible value of an input time, and controlling the vehicle so as to satisfy said charging request amount determined.

* * * * *

UNITED STATES PATENT AND TRADEMARK OFFICE
CERTIFICATE OF CORRECTION

| | | |
|---|---|---|
| PATENT NO. | : 8,989,939 B2 | Page 1 of 1 |
| APPLICATION NO. | : 14/009490 | |
| DATED | : March 24, 2015 | |
| INVENTOR(S) | : T. Aoki | |

It is certified that error appears in the above-identified patent and that said Letters Patent is hereby corrected as shown below:

Specification

At column 3, line 43, change "speed sensor 1, a first" to -- speed sensor 11, a first --.

At column 3, line 60, change "device 10, so as" to -- device 40, so as --.

At column 4, line 62, change "sensor 150 for detecting" to -- sensor 156 for detecting --.

At column 5, line 1, change "current B to ECU 200." to -- current IB to ECU 200. --.

At column 6, line 38, change "value Pchg min" to -- value Pchg_min --.

At column 7, line 2, change "current TB, and" to -- current IB, and --.

At column 7, line 21, change "time 2 for current B does not" to -- time 2 for current IB does not --.

At column 7, line 47, change "value tB_e of current" to -- value IB_e of current --.

At column 12, line 64, change "value hag coincide" to -- value Itag coincide --.

At column 13, line 26, change "process cart be performed" to -- process can be performed --.

At column 14, line 66, change "11: engine speed sensor: 12:" to -- 11: engine speed sensor; 12: --.

At column 15, line 1, change "20: first MG: 30:" to -- 20: First MG; 30: --.

Signed and Sealed this
Twenty-fourth Day of November, 2015

Michelle K. Lee
*Director of the United States Patent and Trademark Office*